Nov. 27, 1934.      F. McFADDEN      1,981,964
OPTICAL DEMONSTRATION APPARATUS
Filed July 10, 1933      3 Sheets-Sheet 1
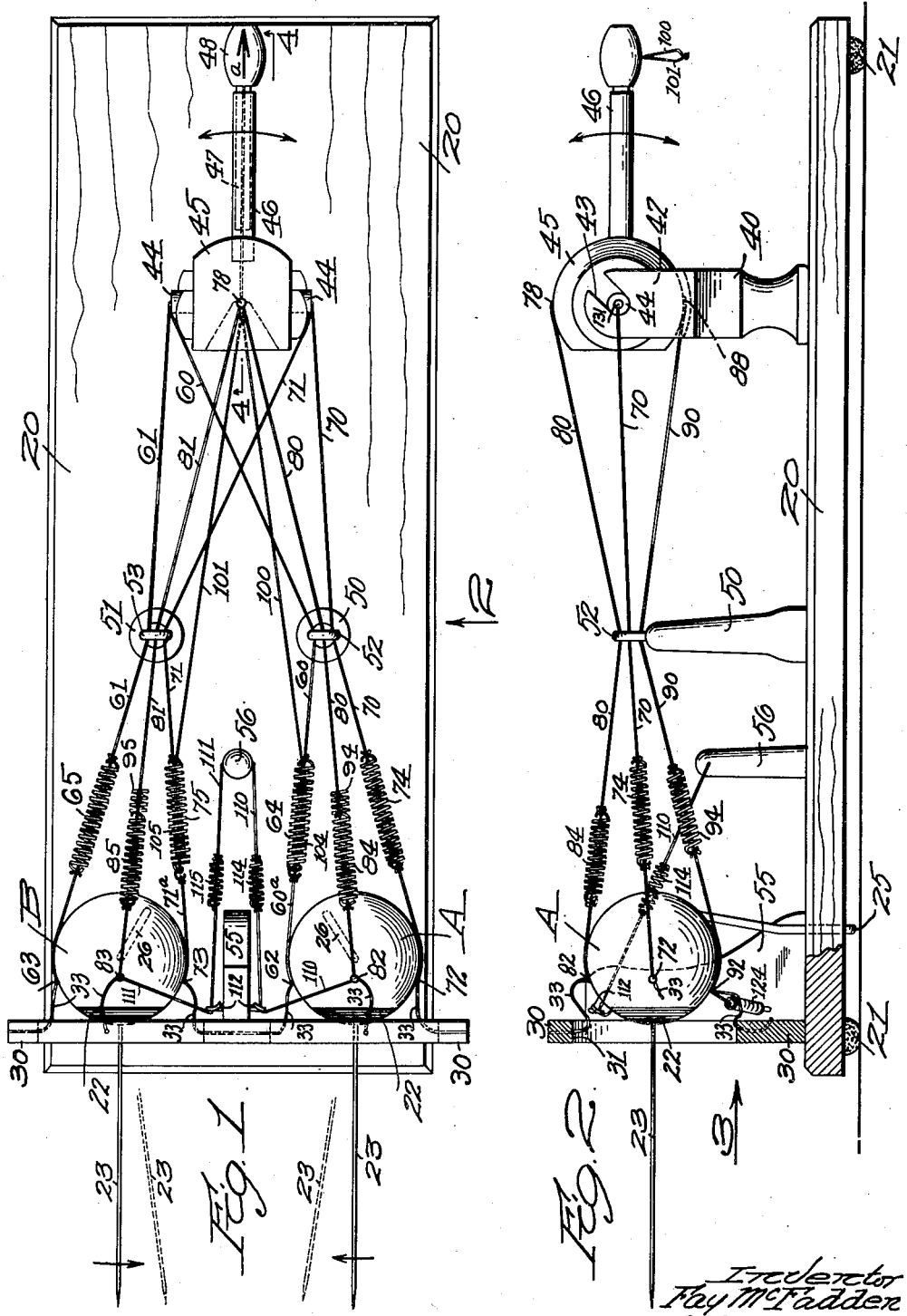

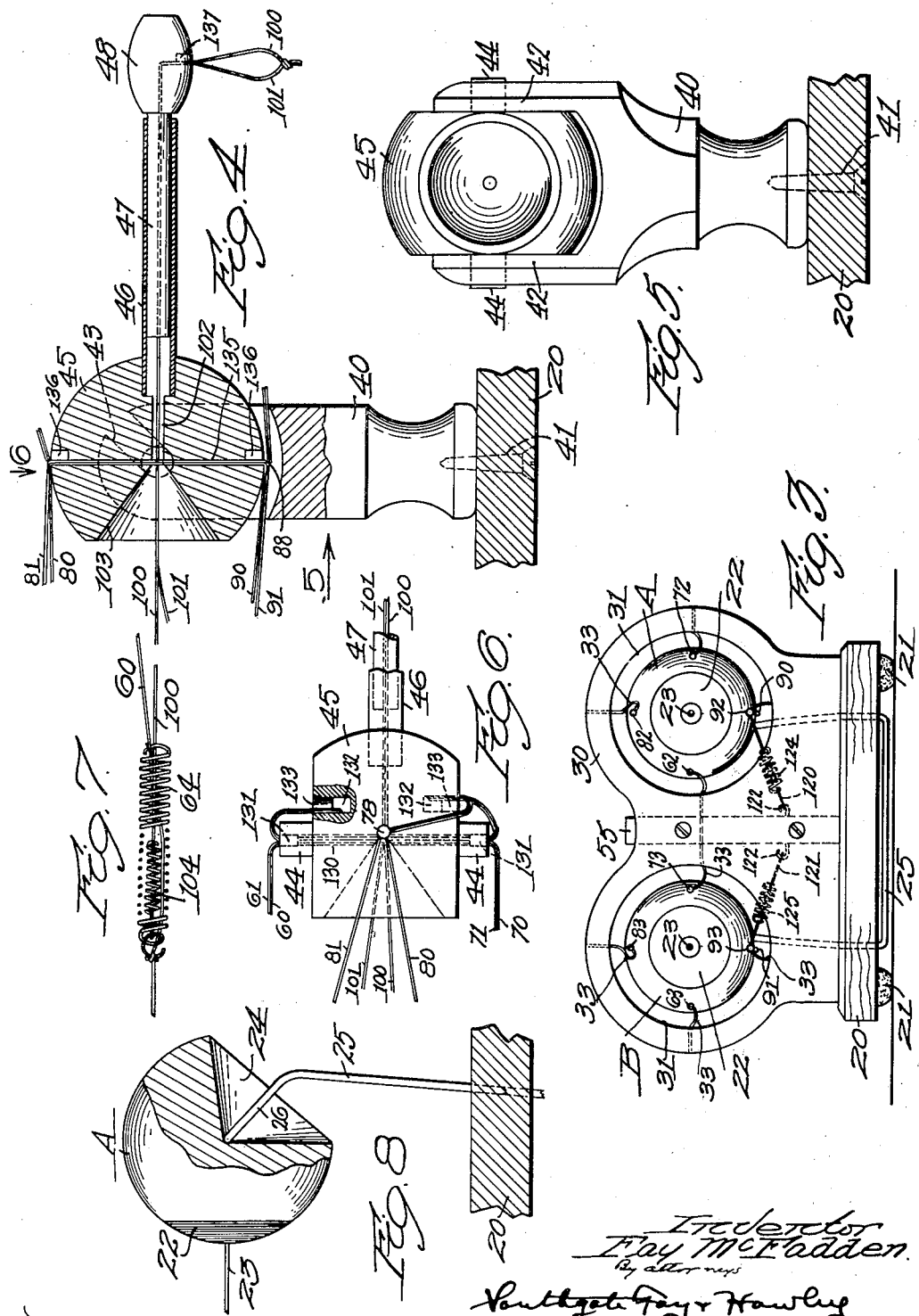

Nov. 27, 1934.  F. McFADDEN  1,981,964
OPTICAL DEMONSTRATION APPARATUS
Filed July 10, 1933   3 Sheets-Sheet 3
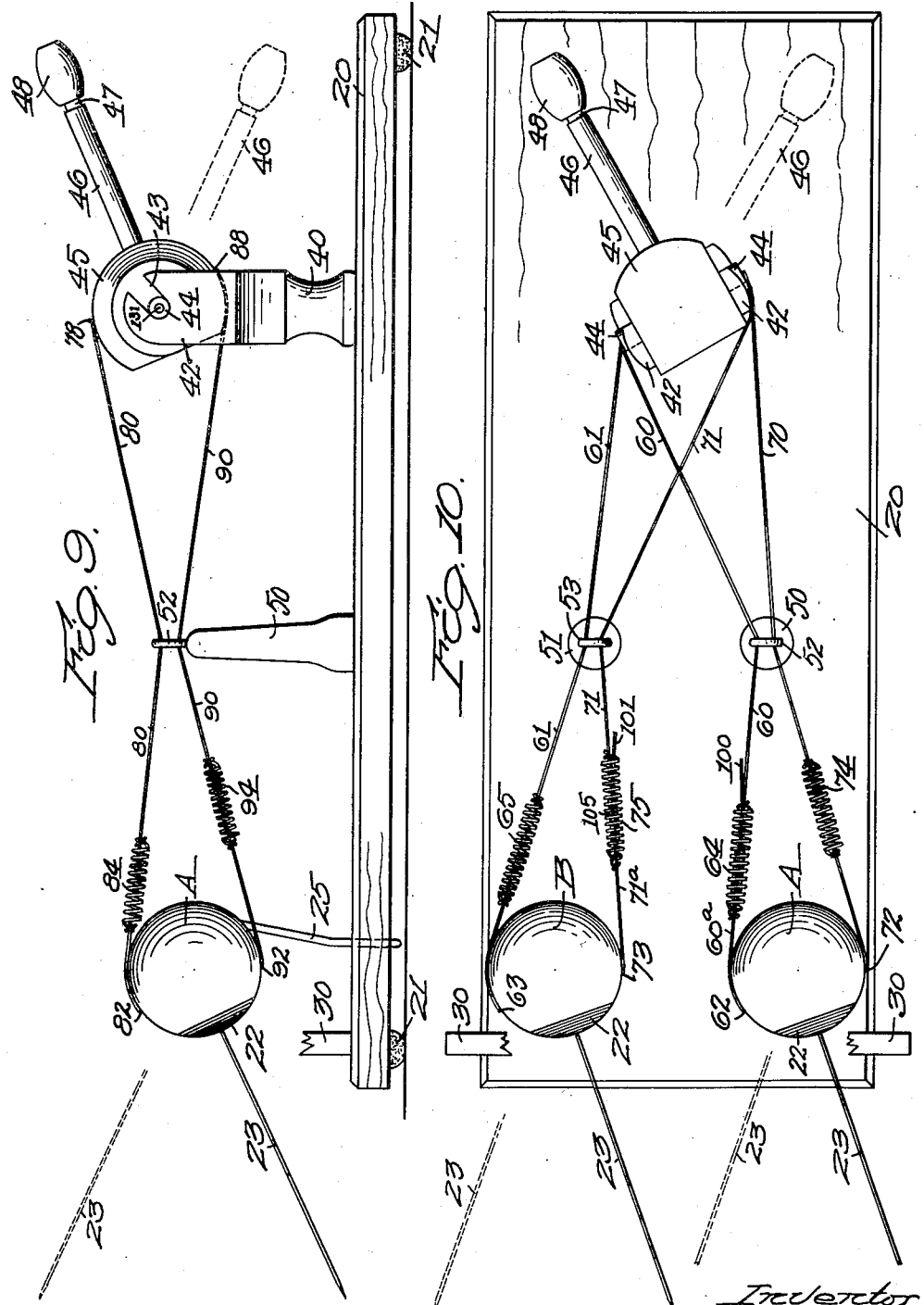

Patented Nov. 27, 1934

1,981,964

UNITED STATES PATENT OFFICE 1,981,964

OPTICAL DEMONSTRATION APPARATUS

Fay McFadden, Rutland, Vt.

Application July 10, 1933, Serial No. 679,756

11 Claims. (Cl. 35—16)

This invention relates to apparatus designed for demonstrating and imitating the movements of human eyes under both normal and abnormal conditions. There is an increasing interest on the part of optometrists and of the public generally in obtaining proper coordination of the eyes, irrespective of their refractive errors.

Persons not well versed in the optic art commonly have little conception of the muscular and neural structure of the eyes, and it is most desirable that such should be enlightened with respect to this mechanism, so that the need of special exercises to develop muscular power and to increase nerve stimulation may be appreciated.

It is the general object of my invention to provide an improved apparatus by which the various movements, controls and functions of the eyes and of the muscles and nerves associated therewith may be clearly demonstrated, and by which the effects of various abnormal conditions of muscular action or neural control may be clearly shown.

A further object of my invention is to provide a demonstrating apparatus in which the separate functions of the nerves and muscles are clearly differentiated. I also provide improved devices for imitating both normal and abnormal binocular movements of human eyes, and I make special provision for relative adjustment of all elements of the apparatus.

My invention further relates to arrangements and combinations of parts which will be hereinafter described and more particularly pointed out in the appended claims.

A preferred form of the invention is shown in the drawings, in which

Fig. 1 is a plan view of my improved demonstrating apparatus;

Fig. 2 is a side elevation thereof, partly in section;

Fig. 3 is an end view, looking in the direction of the arrow 3 in Fig. 2;

Fig. 4 is a detail sectional side elevation, taken along the line 4—4 in Fig. 1;

Fig. 5 is a detail end view, looking in the direction of the arrow 5 in Fig. 4;

Fig. 6 is a plan view, partly in section, looking in the direction of the arrow 6 in Fig. 4;

Fig. 7 is a detail view of certain operating connections to be described;

Fig. 8 is a side elevation, partly in section, showing the pivotal support of one of the eyeballs;

Fig. 9 is a side elevation showing the operation of the device in moving the eyeballs to lower the vision, and Fig. 10 is a plan view showing the operation of the device in swinging the eyeballs to direct the vision to the left in a horizontal plane.

Referring to Figs. 1 to 3, my improved demonstration apparatus comprises a base 20 having cushion members 21 adapted to rest on a table or other supporting surface. A pair of spherical members A and B represent left and right eyeballs, and the front portion of each eyeball is preferably painted a different color, as indicated at 22 in Fig. 8, to represent the iris. Each eyeball is also provided with a detachable wire or pointer 23 to represent the axis of vision.

Each eyeball A and B is formed with a conical recess 24 (Fig. 8) at its rear lower portion, the apex of the cone being substantially at the center of the sphere. A U-shaped supporting rod 25 (Fig. 3) has its end portions or legs extending up through openings in the base 20. These end portions are then bent forwardly and outwardly, as indicated at 26 in Figs. 1 and 8, to provide pivotal supports for the eyeballs A and B and to permit universal motion thereof on said supporting portions 26.

A frame member 30 (Fig. 3) is mounted at one end of the base 20 and just outside of the eyeballs A and B. This frame member 30 corresponds to the so-called "yoke portion" of the human skull and is provided with circular openings 31 corresponding to eye sockets and approximately aligned with the pointers 23. Short cords 33 connect the eyeballs to points at the four quarters of the openings 31 and act as checks to limit excessive turning movement or displacement of the eyeballs in any direction. These cords correspond to the "check ligaments" having a corresponding function in the human structure. The cords 33 also prevent displacement of the eyeballs A and B during shipment.

A swivel post or capstan 40 is pivotally mounted on the rear portion of the base 20 in any convenient manner, as by a pivot screw 41. At its upper end the swivel post 40 is forked, as indicated at 42, and the portions 42 are provided with slots 43 (Fig. 4) to receive the pivot studs or gudgeons 44 of a swiveled operating member 45.

The operative outer surface of the member 45 is spherical, as clearly shown in Figs. 4 and 5, and a tube 46 projects rearward from the member 45 and acts as a handle for turning the swiveled member 45 about a horizontal axis or the swivel post 40 about a vertical axis.

A plunger 47 (Fig. 4) is freely slidable in the hollow tube 46 and is provided with a knob 48 by which it may be conveniently moved in or out relative to the tube. I also provide guide posts 50 and 51 (Fig. 1) having guide rings 52 and 53 at their upper ends, and I further provide a brace member 55 for the end frame member 30 and a post 56 positioned somewhat rearward of said brace member.

I will now describe the operating connections by which the various movements of the eyeballs A and B are obtained. Cords 60 and 61 (Fig. 1) extend from the outer end of the right-hand gudgeon 44 through the guide rings 52 and 53 respectively and are connected to the eyeballs A and B at points 62 and 63 on the right-hand sides thereof. Springs 64 and 65 are interposed in the cords 60 and 61, the cords being knotted to each end of the spring and having a slack portion extending through the spring, so that the springs form yielding elements in the connections between the gudgeon 44 and the eyeballs A and B.

Additional cords 70 and 71 connect the end of the left-hand gudgeon 44 through the guide rings 52 and 53 respectively to points 72 and 73 on the left-hand sides of the eyeballs A and B. These cords 70 and 71 are similarly provided with springs 74 and 75 forming yielding elements in the connections.

A point 78 at the top of the swiveled member 45 is connected by cords 80 and 81 (Fig. 1) through the guide rings 52 and 53 respectively to points 82 and 83 at the tops of the eyeballs A and B, springs 84 and 85 being provided in these connections.

Similarly, a point 88 (Fig. 2) at the bottom of the swiveled member 45 is connected by cords 90 and 91 to points 92 and 93 (Figs. 2 and 3) at the bottom parts of the eyeballs A and B, springs 94 and 95 (Figs. 1 and 2) being interposed in the cords 90 and 91.

Additional cords 100 and 101 (Fig. 4) extend rearward through an opening 102 in the swiveled member 45, which opening connects the inner axial apex of a cone-shaped recess 103 in the member 45 with the tube 46 previously described. The cords 100 and 101 extend loosely through an axial opening in the plunger 47 and are secured in the handle or knob 48. The cone-shaped recess 103 is provided to clear the cords 100 and 101 in all positions of the member 45.

At their forward ends, the cords 100 and 101 extend into the coils of the springs 64 and 75 previously described, and are connected through springs 104 (Fig. 7) and 105 (Fig. 1) to the front ends of the springs 64 and 75 respectively. These springs 104 and 105 are of substantially smaller diameter than the springs 64 and 75, and are loosely supported therein and free to expand or contract independently thereof.

Additional cords 110 and 111 (Fig. 1) extend from the fixed post 56 forward through guides 112 on the brace 55 and are connected at their forward and outer ends to the points 82 and 83 at the tops of the eyeballs A and B to which the cords 80 and 81 are connected. Springs 114 and 115 are interposed in the cords 110 and 111 respectively.

Other additional cords 120 and 121 (Fig. 3) extend from hooks 122 on the brace 55 through springs 124 and 125 to the bottom points 92 and 93 on the eyeballs A and B respectively to which the cords 90 and 91 are attached.

The gudgeons 44 and the swiveled member 45 (Fig. 6) are provided with a horizontal axial passage 130 through which the ends of the cords 60, 61, 70 and 71 are threaded. These cords may then be conveniently tightened and adjusted by pulling on the outwardly projecting end portions thereof and they may be conveniently held in adjusted position by inserting plugs 131 of soft wood in ther ends of said axial opening. Similarly, the loose ends of these cords may be inserted in openings 132 (Fig. 6) and may be retained by additional plugs 133.

The cords 80, 81, 90 and 91 preferably extend through a vertical passage 135 (Fig. 4) in the swiveled member 45 and may be held in adjusted position therein by plugs 136. The cords 100 and 101 may also be conveniently and adjustably secured in the knob 48 by a soft plug 137.

The forward ends of the various cords may be secured at the indicated points on the eyeballs A and B by the use of similar soft wood plugs, or any other convenient method of attachment may be utilized.

Having described the details of construction of my improved demonstration apparatus, I will now explain the manner in which the apparatus may be used to demonstrate movements of the human eyes under normal or abnormal conditions.

The various cords, as 60, 61, 70, 71, etc. are designed to indicate nerves controlling the muscles of the eyes, which muscles are indicated by the various springs 64, 65, 74, 75, etc.

In the optic art it is well understood that each eyeball is provided with six different muscles and the several springs may be identified with these different muscles as follows:

The springs 64 and 75 represent the recti internus, the springs 65 and 74 represent the recti superior, and the springs 94 and 95 represent the recti inferior. The springs 114 and 115 represent the obliqui superior and the springs 124 and 125 represent the obliqui inferior.

The recti externus, represented by the springs 74 and 75, are in reality duplex muscles, some of the fibers of which are devoted to conjoint turning or vergency of both eyeballs to the right or the left, while other fibers are devoted to converging the eyeballs in accordance with the focal distance to the object to be viewed. The outer springs 64 and 75 represent the fibers devoted to conjoint turning movements, while the inner springs 104 and 105 represent the muscular fibers devoted to convergence.

In demonstration use of the apparatus, movement of the knob 48 (Fig. 1) to the rear or in the direction of the arrow $a$ will tension the cords 100 and 101, which in turn will tension the springs 104 and 105 and will act through the front portions 60$^a$ and 71$^a$ of the cords 60 and 71 to turn both eyeballs simultaneously inward or in directions which will move the pointers 23 to the dotted line positions of Fig. 1, thus causing convergence of the eyes on an object at a shorter focal distance.

It will be noted that this converging movement is entirely independent of any movement of the cords and springs representing other motor nerves and muscles, as the cords 100 and 101 extend from the front end of the opening 102 (Fig. 4) which is in both the vertical and the horizontal axis of the swiveled member 45.

In Fig. 9 I have indicated the operation of the inferior and superior recti in lowering the line of vision in a vertical plane. To produce this effect, the handle 46 is swung upward from the dotted to the full line position shown in Fig. 9, tensioning the cords 90 and 91 and the springs 94 and 95, and causing the eyeballs A and B to turn downward, moving the pointers 23 to the full line position in Fig. 9. This is accomplished, however, without increase of tension in the cords 80 and 81 and springs 84 and 85 representing the recti superior, as these cords and springs yield and follow the movements of the tension cords 90 and 91 and the springs 94 and 95.

After the movement has been completed therefore, both sets of cords and springs are in substantially the original and normal condition of tension, illustrating the fact, not always appreciated, that the eyes are not commonly under muscular strain merely because they are moved from the normal position of straight forward vision.

In Fig. 10 I have similarly illustrated the turning or vergency of the eyeballs A and B to the right as indicated by the full line positions of the pointers 23. To effect this result, the handle 46 is swung to the left to the full line position, thus tensioning the cords 70 and 71 and similarly tensioning the spring 74 and 75 representing the rectus externus for the eyeball A and the rectus internus for the eyeball B. At the same time, the cords 60 and 61 and spring 64 and 65 are relaxed to prevent opposing tension.

In all positions of the eyeballs, the cords 110, 111, 120 and 121 and the springs 114, 115, 124 and 125 act as oblique balancers and demonstrate the function of the oblique muscles in maintaining binocular fixation for all angular positions of the eyeballs. An unbalanced condition may be demonstrated by changing the tension of one of the springs 114, 115, 124 or 125, thus causing one pointer to be raised or depressed relative to the other on convergence.

I have thus far described the use of the apparatus in demonstrating normal action of the eyes and of the muscles and nerves controlling the same. Abnormal action such as lateral converging or diverging imbalance, or vertical imbalance, technically termed esophoria, exophoria and hyperphoria, may be demonstrated by manually placing excessive tension on a corresponding cord and spring, or by placing a pad on the eyeball A or B under the end of a selected cord, thereby mechanically effecting the additional tension. By thus proceeding, the apparatus may be caused to demonstrate such faulty conditions of operation, or such other similar condition as may be desired.

It will thus appear that my improved demonstration apparatus is uniquely adapted to represent visually all conditions of relative movement of the human eyes, both normal and abnormal, and that the apparatus particularly represents the duplex structure and function of the recti internus, and the alternate tensioning and relaxation by which turning movements of the eyeballs may take place without maintaining the muscles of the eye under abnormal tension while the eyes are thus out of normal or straight line position.

Having thus described my invention and the advantages thereof, I do not wish to be limited to the details herein disclosed, otherwise than as set forth in the claims, but what I claim is:—

1. In an optical demonstration apparatus, a pair of eyeballs, supports engaging said eyeballs substantially at the centers thereof and supporting said eyeballs for universal movements, and mechanical means to effect conjoint turning movements of said eyeballs in horizontal and vertical planes, said mechanical means comprising a swivel post mounted substantially rearward of said eyeballs and rotatable about a vertical axis, an operating member pivoted on said post to swing about a horizontal axis, said operating member having a handle portion, and operating connections from spaced points on said member to spaced points on each eyeball.

2. In an optical demonstration apparatus, a pair of eyeballs, supports engaging said eyeballs substantially at the centers thereof and supporting said eyeballs for universal movements, a manually operated member, and connections from said member to said eyeballs through which connections movements of said member effect conjoint movements of said eyeballs and in the same direction as the movement of said member.

3. In an optical demonstration apparatus, a pair of eyeballs, supports engaging said eyeballs substantially at the centers thereof and supporting said eyeballs for universal movements, a manually operated member, and connections from said member to said eyeballs through which connections movements of said member effect conjoint movements of said eyeballs in the same direction as the movements of said member and about vertical, horizontal or inclined axes.

4. In an optical demonstration apparatus, a pair of eyeballs, supports engaging said eyeballs substantially at the centers thereof and supporting said eyeballs for universal movements, and mechanical means to effect conjoint turning movements of said eyeballs in horizontal and vertical planes and additional converging movements of said eyeballs, said mechanical means comprising a swivel post mounted substantially rearward of said eyeballs and rotatable about a vertical axis, an operating member pivoted on said post to swing about a horizontal axis, said member having a rearwardly extending handle portion, operating connections from spaced points on said member to spaced points on each eyeball, a device manually slidable longitudinally relative to said handle portion, and additional connections from said device to points on adjacent side surfaces of said eyeballs.

5. In an optical demonstration apparatus, a pair of eyeballs, supports engaging said eyeballs substantially at the centers thereof and supporting said eyeballs for universal movements, a single mechanical device spaced substantially rearward from said eyeballs and separately supported and manually operative to effect conjoint turning movements of said eyeballs in horizontal and vertical planes, and additional means associated with said device and manually operable to effect additional converging movements of said eyeballs in every position to which said eyeballs are conjointly turned.

6. In an optical demonstration apparatus, a pair of eyeballs, supports engaging said eyeballs substantially at the centers thereof and supporting said eyeballs for universal movements, cords connected in pairs to said eyeballs and representing control nerves, springs connected in said cords and representing muscles associated with said nerves, and means to tension selected cords and springs to effect conjoint turning movement of said eyeballs in a predetermined direction and to simultaneously relax opposing cords and springs, thereby maintaining substantially normal tension in said cords and springs in all angular positions of said eyeballs.

7. In an optical demonstration apparatus, a pair of eyeballs, supports engaging said eyeballs substantially at the centers thereof and supporting said eyeballs for universal movements, a pair of operating members for each eyeball, attached thereto at opposite points thereon and extending rearward therefrom, and means to move the two members of each pair simultaneously in opposite directions to effect conjoint turning movements of said eyeballs.

8. In an optical demonstration apparatus, a pair of eyeballs, supports engaging said eyeballs substantially at the centers thereof and supporting said eyeballs for universal movements, cords connected in pairs to said eyeballs, a swiveled manually-operated member to which said cords are connected, and a swivel post in which said swiveled member is pivotally mounted.

9. In an optical demonstration apparatus, a pair of eyeballs, supports engaging said eyeballs substantially at the centers thereof and supporting said eyeballs for universal movements, cords connected in pairs to said eyeballs, and a swiveled member to which said cords are connected, a swivel post in which said swiveled member is pivotally mounted, and manual means to turn said member and post about horizontal and vertical axes respectively.

10. An optical demonstration apparatus as set forth in claim 9, in which said swiveled member has a conical recess on the forward side thereof, and in which additional connections extend from points on said eyeballs to a point substantially at the apex of said conical recess and substantially at the axis of said swiveled member, and separate means to tension said additional connections.

11. An optical demonstration apparatus as set forth in claim 9, in which said swiveled member has a conical recess on the forward side thereof, and in which additional connections extend from points at the inner sides of said eyeballs to a point substantially at the apex of said conical recess and substantially at the axis of said swiveled member, and separate means to tension said additional connections to cause said eyeballs to converge.

FAY McFADDEN.